United States Patent [19]
Katayama

[11] 4,195,926
[45] Apr. 1, 1980

[54] DEVICE FOR DISPLAYING A PHOTOMETRY CONDITION IN A FINDER OF A CAMERA

[75] Inventor: Akira Katayama, Tokyo, Japan
[73] Assignee: Nippon Kogaku K.K., Tokyo, Japan
[21] Appl. No.: 908,828
[22] Filed: May 23, 1978
[30] Foreign Application Priority Data
May 28, 1977 [JP] Japan .............................. 52-68136[U]
[51] Int. Cl.² .......................... G03B 9/02; G03B 17/20
[52] U.S. Cl. ..................................... 354/273; 354/289
[58] Field of Search .............................. 354/270–273, 354/286, 289, 46, 219, 152

[56] References Cited
U.S. PATENT DOCUMENTS

| 3,820,124 | 6/1974 | Taguchi et al. | 354/270 X |
| 4,085,416 | 4/1978 | Ishizaka | 354/152 X |
| 4,130,358 | 12/1978 | Lang et al. | 354/286 X |

Primary Examiner—John Gonzales
Attorney, Agent, or Firm—Fitzpatrick, Cella, Harper & Scinto

[57] ABSTRACT

This invention provides a device to display information in a finder of a camera equipped with TTL a type photometer, whether it is in the state of fully-opened photometry or in the state of stopped photometry. The camera has a signal receiving member for transmitting to the photometer or stop, information from a signal generating member provided at the side of the lens structure. The position of the signal receiving member can be switched between a first interlocking position and a second non-interlocking position. The signal receiving member, when located in the first position, interlocks in action with the lens structure for receiving the stop information. The signal receiving member, when located in the second position, does not interlock in action with the lens structure so that it cannot receive the stop information. The display means functions to indicate in the finder the state of the fully-opened photometry when the signal receiving member locates in the first position, and the state of stopped photometry when the signal receiving member locates in the second position.

2 Claims, 2 Drawing Figures

DEVICE FOR DISPLAYING A PHOTOMETRY CONDITION IN A FINDER OF A CAMERA

BACKGROUND OF THE INVENTION

1. Field of the Invention

This invention relates to a device for displaying a photometering condition in the finder of camera having a TTL (Through The Lens) type photometer.

2. Description of the Prior Art

It is usual to use a fully-opened photometry system in a camera so that, for example, the finder shall not be darkened even when the stop value is changed at the time of photometry. For this purpose, a signal generating member is provided at a lens side for producing a stop value information and a signal receiving member is provided at a camera body side for receiving said signal, and both members are coupled when the lens is mounted to the camera body for enabling the transmission of the signal. There have been proposed various improvements on the interlocking mechanism including said two members for simplifying mounting and dismounting operations of the lens to and from the camera body.

However, when a camera body and a lens equipped with an improved interlocking mechanism come into use, it is frequently found that the lens equipped with an old type interlocking mechanism cannot be used with the camera body having the new type interlocking mechanism. This is caused by the fact that the old type lens interferes with the signal receiving member of the new type camera body, or interlocking relation between the lens and camera body cannot be secured.

It is, however, necessary for a photographer having the old type lens to enable him to use the old type lens with the new type camera body. Therefore, there has been a proposal according to which the signal receiving member of the new type camera body is moved to a position where no interference occurs with respect to the old type lens and the photometer is used under a stopped photometry state.

However, this introduces a further problem, i.e. the possibility of forgetting to return the signal receiving member of the camera body to its original position for the new lens after using it for the old lens. In this case, if a photographer intends to use it under stopped photometry there is no problem, however, if he wishes to use it under fully-opened photometry but he forgets to make the necessary operation for the stopped photometry, namely, to push the button for the stopped photometry, he will misjudge the indication of the photometered information.

SUMMARY OF THE INVENTION

The object of the invention is to provide means to determine whether the photometer is in the state of fully-opened photometry or in the state of stopped photometry by detecting the change of the position of the signal receiving member and indicating it in the finder.

DETAILED DESCRIPTION OF THE PREFERRED EMBODIMENT

Figure 1:
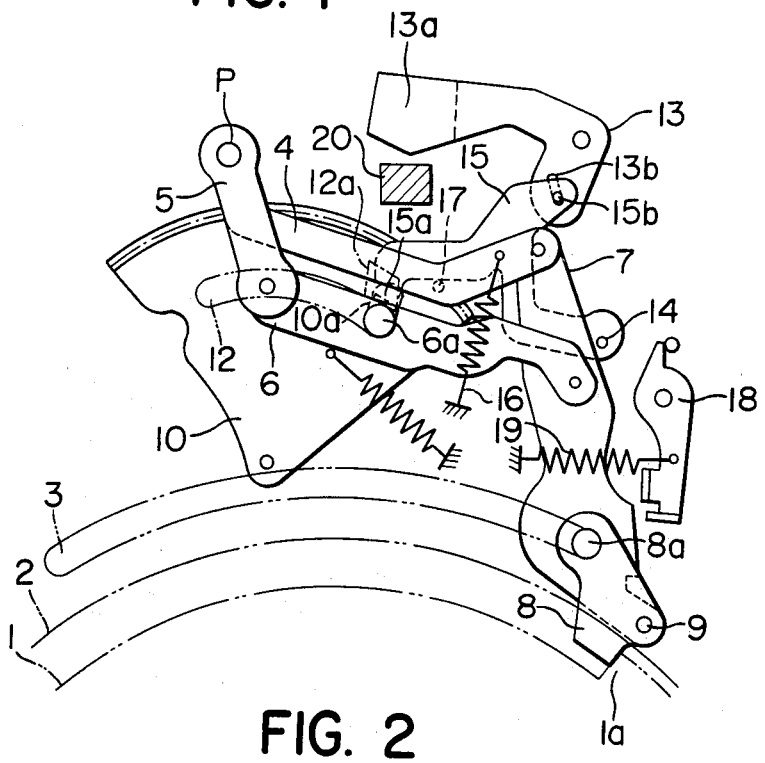
FIG. 1 shows the state of full-opened photometry of an embodiment of the invention.
Figure 2:
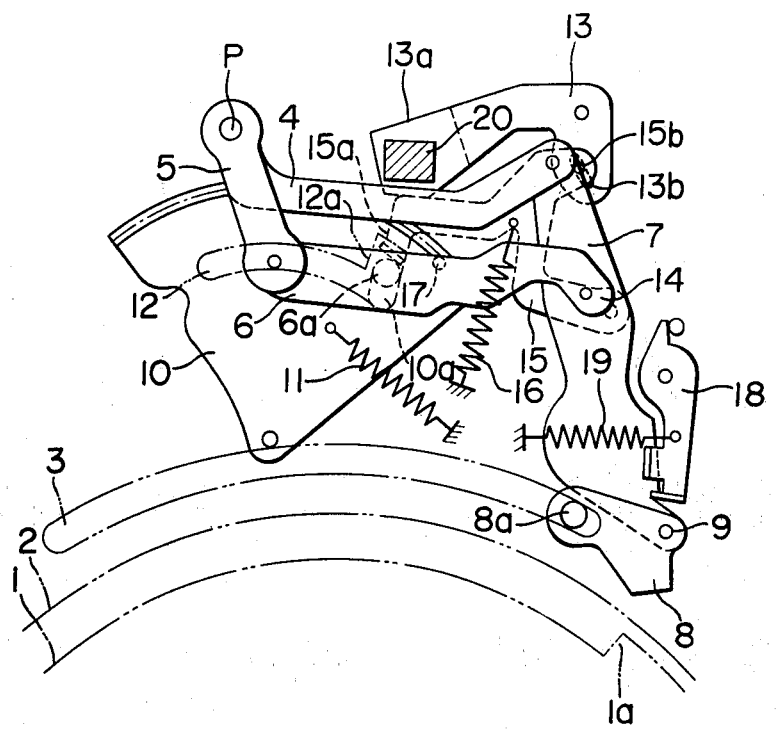
FIG. 2 shows the stopped photometry state.

In FIGS. 1 and 2, an annular ring 1 of a stop of the improved lens has a projection 1a representing a signal generating member. The diameter of an annular ring 2 of the conventional lens is larger than that of the annular ring 1, which is the reason for the interference between it and a signal receiving member. A signal generating member of the conventional lens is not shown in the drawing. These stop rings 1 and 2 are adapted to rotate around the optical axis, as is fully known in the field of this art.

Now the explanation will be made for the elements provided at the camera side. Channel or groove 3 is formed in a circular arc around the optical axis of the lens. The four-connection links 4, 5, 6 and 7 move as a fixed pin P as their rotating center and form a pantagraph mechanism. An interlocking member 8, which is a signal receiving member, has a pin 8a fitted in the channel 3. The interlocking member 8 and the link 7 are rotatably connected with each other by a pin 9. A rotatably supported gear 10 has a switching aperture 10a biased in the clockwise direction by a spring 11. The gear 10 is in the interlocking relationship with a not-shown variable resistor brush for converting a stop information to be transmitted to a not-shown photometer into an electric signal. A guide groove 12 is formed in gear 10 in a circular arc, of which the center is the rotating center of the gear 10, and has a locking groove 12a at its one end corresponding to the switching aperture 10a. A pin 6a planted on the link 6 penetrates the aperture 10a and fits in the guide groove 12. Thus the pin or shaft 9 connecting the link 7 and the interlocking member 8 and a pin 6a of the link 6 can effect similar movements. The links 4 through 7 are biased to move rightwardly in FIGS. 1 and 2 with the aid of the spring 11 acting through the pin 6a and the gear 10.

A rotatably supported displaying lever 13 has a color filter 13a adhered to its one end. A detecting lever 15 rotatably supported by a shaft 14 has at its one end a bent portion 15a engageable with the pin 6a and at its other end a pin 15b fitted in a hole 13b. A spring 16 biases the detecting lever 15 in anticlockwise direction. A pin 17 limits the anti-clockwise rotation of the lever 15 by the spring 16. A locking member 18 to lock the link 7 is biased in clockwise direction by a spring 19. A light path 20 is to display in the finder a stop value set at the lens side and locates in the rotating locus of the filter 13a.

The operation of the embodiment constructed as abovementioned will be explained. For convenience, the order of operation is determined such that firstly a stopped photometry is made by switching the mode from fully-opened photometry into the stopped photometry and then fully-opened photometry is made by switching the mode from the stopped photometry into the fully-opened photometry.

In FIG. 1, the interlocking plate 8 is in a first position to be engageable with the projection 1a of the stop ring 1 of the improved lens. The interlocking plate 8 is rotated anti-clockwise to a second non-interlocking position shown in FIG. 2 where the plate 8 does not interfere with the stop ring 2 of the old type lens and the plate 8 is not able to engage with the projection 1a of the improved lens. By the rotation of the plate 8 the shaft 9 also rotates in anti-clockwise direction so that the pin 6a slides upwardly within the switching aperture 10a by reason of the movement of the link 6. As the plate 8 arrives at the non-interlocking position, as shown in FIG. 2, the link 7 is stopped by the locking member 18, and the plate 8 stops at this second non-interlocking position. Simultaneously, the pin 6a is stopped by engaging with the upper edge of the switching aperture 10a. By this sliding motion of the pin 6a the detecting lever 15 is rotated clockwisely against the spring 16 and the pin 15b will rotate the displaying lever 13 anti-clockwise. Thus the color filter 13a enters into the light path 20 for indicating in the finder that the photometer is now in the state of stopped photometry. Consequently, a photographer can make a proper photometry by varying the stop value while depressing the separately provided not-shown stopping button. It is noted that since the pin 6a fits in the groove 12a the gear 10 will not be rotated.

Next, from the stopped photometry state shown in FIG. 2, the locking member 18 is rotated anti-clockwisely against the spring 19 and the member 18 is disengaged from the link 7. Thus, the pin 6a will receive the restoring force of the spring 16 through the bent portion 15a of the detecting lever 15 to slide downwardly within the switching groove 12a. In interlocking with this movement of the pin 6a, the links 4 through 7 move and the interlocking plate 8 rotates by the link 7 from the non-interlocking position of FIG. 2 to the interlocking position of FIG. 1. As the detecting lever 15 engages with the stop pin 17 the pin 6a arrives at the lowermost position within the groove 10a so that the pin 6a can slide circumferentially within the guide groove 12 and the interlocking plate 8 reaches its interlocking position so as to be engageable with the projection 1a of the improved lens, and the photometer will be in the fully-opened photometry state.

On the other hand, by the anti-clockwise rotation of the detecting lever 15, the displaying lever 13 rotates in the clockwise direction so that the color filter 13a moves out of the light path 20 and fully-opened photometry state of the photometer is indicated in the finder. Consequently, a photographer can mount the improved lens to the camera body and the fully-opened photometry can be made by rotating the stop ring 1. When the stop ring 1 is rotated in this state, the plate 8 moves in a circular arc along the groove 3 by the projection 1a, so that the pin 6a slides along the guide groove 12 by the link 6. Thus the gear 10 rotates to move the brush of the variable resistor for transmitting the stop information to the photometer.

In the above explained embodiment, the movement of the interlocking plate 8 between the interlocking and non-interlocking positions is mechanically detected by the detecting lever 15 so as to move the color filter 13a out and in the light path 20, however, this function can also be achieved by the following structure.

The interlocking or non-interlocking position of the interlocking plate 8 is electrically detected and with the provision of an illuminant of, for example, a photoluminescent diode in the finder, the state of non-interlocking can be seen in the finder by the lighting of the diode and the state of interlocking can be identified in the finder without lightening of the diode.

According to the present invention, a phototaking error due to misjudging of the photometry state can be avoided by the indication in the finder of the state either in fully-opened photometry or stopped photometry.

What I claim is:

1. In a device for displaying information in a finder of a camera having a signal receiving member for transmitting to a photometer a stop information from a signal generating member provided at a lens structure, the signal receiving member being manually movable between interlocking position where the signal receiving member can receive the stop information in interlocking relation with the lens structure and a non-interlocking position where the signal receiving member cannot receive the stop information by blocking the interlocking relation between the signal receiving member and the lens structure, the improvement comprising: displaying means associated with the signal receiving member to indicate in the finder in accordance with the displacement of the signal receiving member whether fully opened photometry or stopped photometry is effected.

2. A device according to claim 1, wherein the signal receiving member, when it is located in the non-interlocking position, is free from interference with a mounted lens structure which would normally interfere with the signal receiving member located at its first position.

* * * * *